US007099977B2

(12) United States Patent
Chong et al.

(10) Patent No.: US 7,099,977 B2
(45) Date of Patent: Aug. 29, 2006

(54) PROCESSOR INTERRUPT FILTERING

(75) Inventors: Huai-Ter Victor Chong, Dallas, TX (US); Gary Belgrave Gostin, Plano, TX (US); Craig W. Warner, Addison, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 10/756,434

(22) Filed: Jan. 12, 2004

(65) Prior Publication Data

US 2005/0154810 A1    Jul. 14, 2005

(51) Int. Cl.
*G06F 13/00* (2006.01)
(52) U.S. Cl. .................... 710/262; 710/266; 710/268
(58) Field of Classification Search .................. None
See application file for complete search history.

(56) References Cited

U.S. PATENT DOCUMENTS

| 5,842,026 | A  | * | 11/1998 | Wong-Chan et al. | ....... 710/260 |
| 6,959,352 | B1 | * | 10/2005 | Dickey | ....................... 710/262 |
| 7,000,051 | B1 | * | 2/2006  | Armstrong et al. | ......... 710/267 |
| 2002/0152344 | A1 | * | 10/2002 | Holm et al. | ................ 710/260 |
| 2004/0019723 | A1 | * | 1/2004  | Ostrovsky et al. | .......... 710/260 |
| 2004/0210705 | A1 | * | 10/2004 | Armstrong et al. | ......... 711/100 |

* cited by examiner

*Primary Examiner*—Glenn A. Auve

(57) ABSTRACT

A method for processing an interrupt message in a system having a plurality of processors arranged into at least two partitions. The interrupt message is decoded to identify an interrupt source. If the interrupt source is not in an interrupt set, the interrupt is dropped. If the interrupt source is in a local partition, the interrupt is delivered. If the interrupt source is in the interrupt set and not in the local partition, the interrupt is processed in accordance with at least one of a target enable register and a vector enable register.

19 Claims, 4 Drawing Sheets

PROCESSOR INTERRUPT FILTERING

FIELD OF THE INVENTION

The invention pertains to the field of processor interrupts and, in particular, to filtering processor interrupts.

BACKGROUND

In a computer system having processors and peripheral devices, such as a memory or other input/output device, interrupts may be used to request a processor to perform a task with regard to the peripheral device or to execute certain instructions. The processor receives an interrupt request including an interrupt vector where the interrupt vector identifies the instructions or task to be performed by the processor.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some general concepts of the invention in a simplified form as a prelude to the more detailed description that is presented later.

In one embodiment, the invention encompasses a method for processing an interrupt message in a system having a plurality of processors arranged into at least two partitions. The interrupt message is decoded to identify an interrupt source. If the interrupt source is not in an interrupt set, the interrupt is dropped. If the interrupt source is in a local partition, the interrupt is delivered. If the interrupt source is in the interrupt set and not in the local partition, the interrupt is processed in accordance with at least one of a target enable register and a vector enable register.

In another embodiment, the invention encompasses an apparatus for processing an interrupt in a system having a plurality of processors arranged into at least two partitions. An interrupt set register identifies an interrupt source from which interrupts may be accepted. A partition set register identifies an interrupt source within the same partition as an interrupt target. A target enable register characterizes the enablement of an interrupt target to process interrupts. A vector enable register identifies interrupt vectors enabled for processing. An interface module receives an interrupt message and includes an interface processor for decoding the received interrupt message to identify at least one of a corresponding interrupt source, interrupt vector, and interrupt target and selectively transmitting the received interrupt message to the interrupt target responsive to at least one of the interrupt source, interrupt vector, interrupt target, interrupt set register, partition set register, target enable register, and vector enable register.

In yet another embodiment, the invention encompasses a symmetric multiprocessor system comprising a plurality of cells and a routing fabric for communicating a packet from one cell to another cell. A cell includes at least one processor and at least one interface to the routing fabric. The interface includes an interrupt set register identifying a processor from which interrupts may be accepted, a partition set register identifying a processor within the same partition as a target processor, a target enable register characterizing the enablement of a target processor to process interrupts, a vector enable register identifying interrupt vectors enabled for processing, and an interface processor. The interface processor decodes a received interrupt message to identify at least one of a corresponding source processor, interrupt vector, and target processor and selectively transmits the received interrupt message to the target processor responsive to at least one of the source processor, interrupt vector, target processor, interrupt set register, partition set register, target enable register, and vector enable register.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

Figure 1:
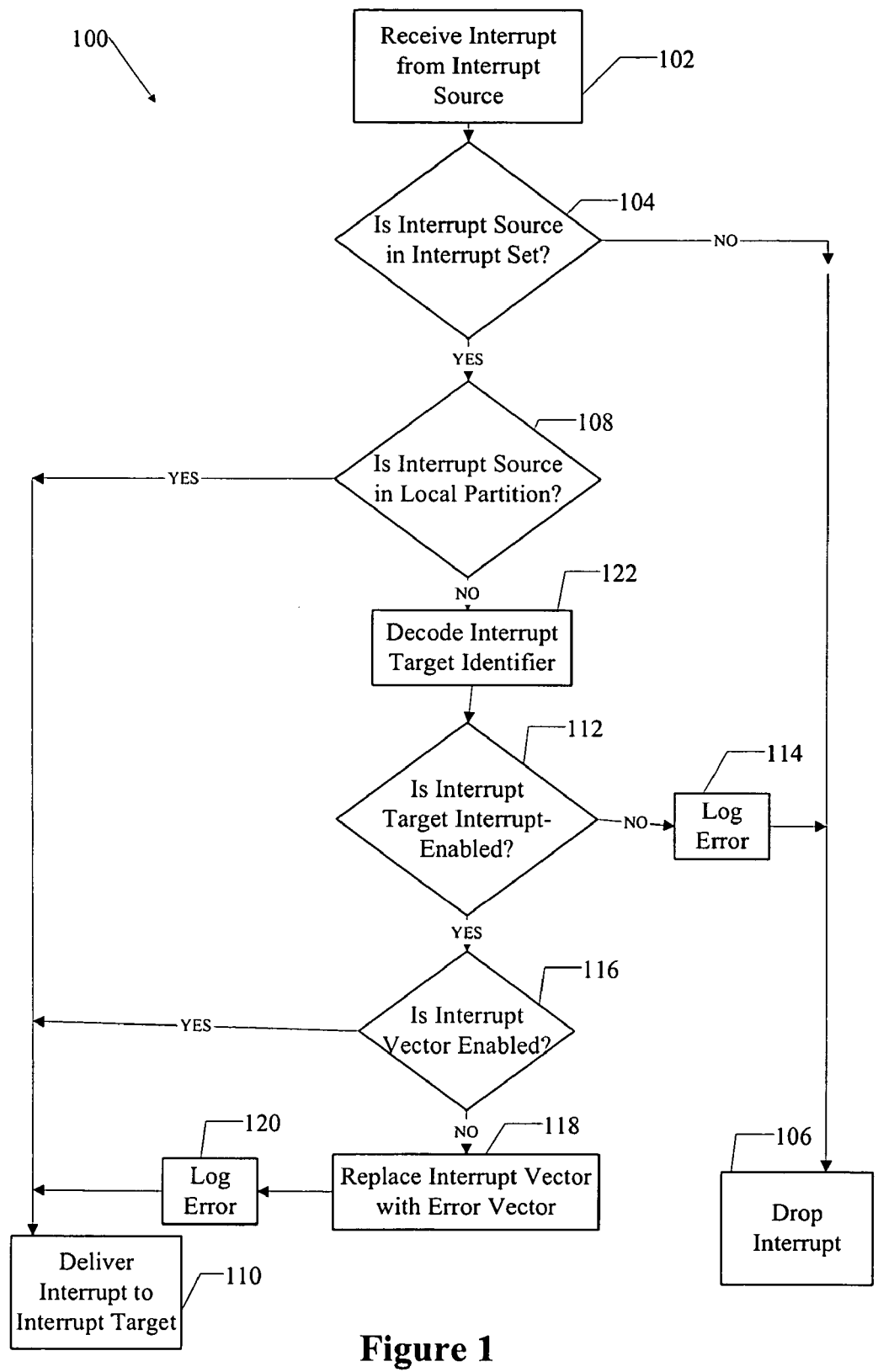
FIG. 1 is a flow chart of a method of processing an interrupt according to an embodiment of the invention.
Figure 2:
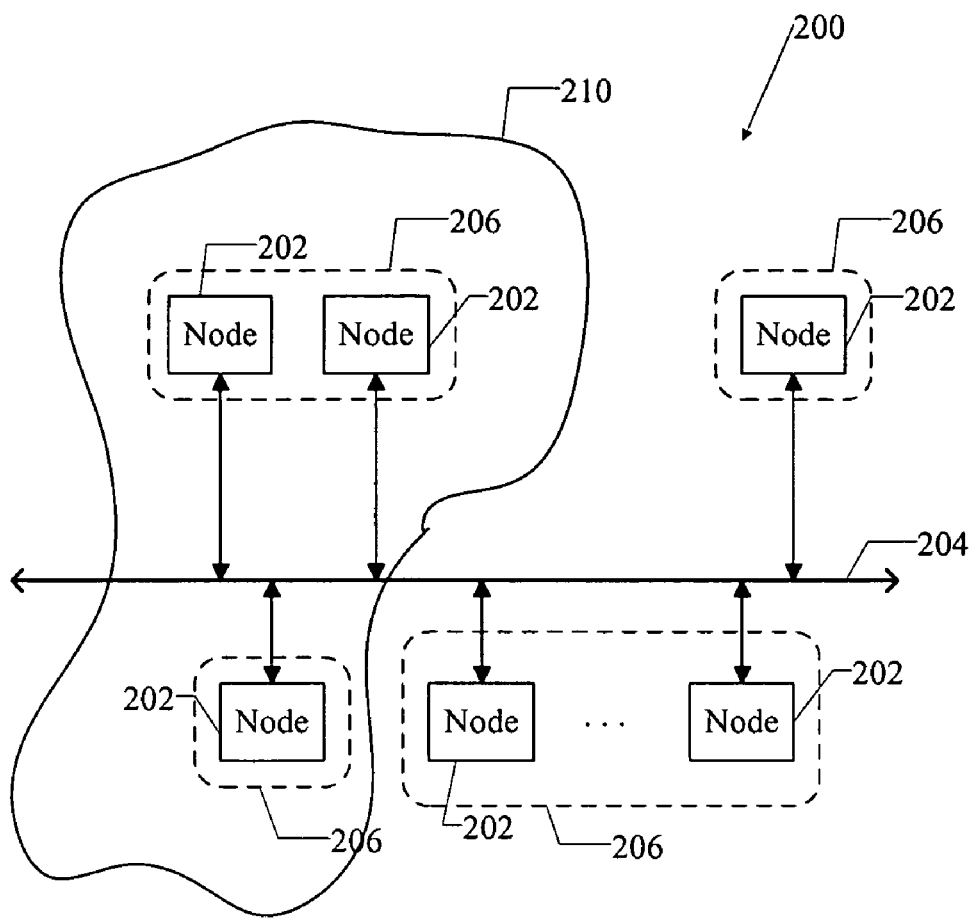
FIG. 2 is a block diagram of a system for processing an interrupt according to an embodiment of the invention.

Referring to the drawings, in which like reference numerals indicate like elements, there is shown in FIG. 1 a flow chart 100 illustrating a method of processing an interrupt message or transaction described with reference to a system 200 shown in FIG. 2.

The system 200 includes a plurality of nodes 202 coupled to each other via a communication medium 204. Each node 202 includes at least one processor and an interface to the communication medium 204. A method of processing interrupts is executed by the interface in an embodiment of the invention.

One or more nodes 202 are grouped to form partitions illustrated by the dashed lines 206. In an embodiment, partitions 206 are used to segregate a processor in one node from a processor in another node that may be running under different operating systems (e.g., Windows, Unix) or different applications.

A processor in one node 202 ("interrupt source") may generate an interrupt for a processor in another node 202 ("interrupt target"). In an embodiment, a node 202 in the system may send a message (interrupt message or transaction) to a processor on another node 202 via an interrupt. In an embodiment, the interrupt message informs or instructs another node 202 to perform a particular task. Such a task may, for example, comprise instructing a node to add another node to its partition. A resource such as memory may be shared by allowing access to the resource by another node 202 via an interrupt. In an embodiment, the nodes 202 may generate an interrupt message to access the memory of another node 202 on a read-only basis and bi-directional communication (or interrupts) between nodes are implemented by generating and processing interrupts in both direction between nodes.

When one node 202 generates in interrupt, it is transmitted over the communications medium 204 to another node 202. The term "interrupt source" is used herein to identify the processor generating the interrupt or the node comprising that processor. The term "interrupt target" is used herein to identify the processor to which the interrupt is targeted or the node comprising that processor.

An interrupt message from an interrupt source is received in step 102 and is decoded to determine an interrupt source identifier. An interrupt set identifies interrupt sources (processors or cells) from which interrupts may be processed. An exemplary interrupt set is illustrated in FIG. 2 by the line 210 encompassing several partitions 206. An interrupt received from an interrupt source is processed if the interrupt source is identified in the interrupt set and is discarded or dropped if the interrupt source is not identified in the interrupt set. The interrupt source is determined to be in or out of the interrupt set in step 104. If the interrupt source is determined to not be in the interrupt set, the interrupt is dropped (e.g., discarded and not processed) in step 106.

In an embodiment, the interrupt set identifies processors within the system 200 from which interrupts may be accepted and the interrupt source identifier identifies the processor which originated a corresponding interrupt. In another embodiment, the interrupt set identifies nodes 202 from which interrupts may be accepted and the interrupt source identifies the node which originated a corresponding interrupt. For example, a packet including an interrupt request may include a source address that identifies the processor or the node that includes the processor that originated the request.

The system 200 determines in step 108 whether the interrupt source is in a local partition where the interrupt source is "local" if it is in the same partition that includes the interrupt target. If the interrupt source is within the interrupt set and within the local partition, the interrupt is delivered to the interrupt target in step 110. If the interrupt source is in the interrupt set but not in the local partition, the interrupt is processed in accordance with at least one of a target enable register and a vector enable register.

A vector enable register characterizes the enablement of interrupt vectors. In an embodiment, an interrupt message includes an n-bit interrupt vector and the vector enable register includes $2^n$ bits, one for each combination of the n bits in the interrupt vector. Each bit of the vector enable register defines whether a particular combination of the n bits in an interrupt vector is enabled or disabled. In an embodiment, a bit value of "1" in the vector enable register enables a corresponding interrupt vector and a bit value of "0" disables the corresponding interrupt vector.

A target enable register characterizes the enablement of a interrupt target (processor or node) to process an interrupt. In an embodiment, the target enable register includes one bit corresponding to each of the interrupt targets (processor or node) in the system 200 and a bit value of "1" identifies a corresponding interrupt target as being enabled to process interrupts and a bit value of "0" identifies a corresponding interrupt target as being disabled.

In the embodiment illustrated in FIG. 1, the processing of an interrupt is described in accordance with a target enable register and a vector enable register. The interrupt is decoded to identify an interrupt target in step 122. The system 200 determines whether the interrupt target is enabled to accept interrupts based on the target enable register in step 112. If the interrupt target is not enabled to process interrupts, the error is logged in step 114 and the interrupt is dropped in step 106. In an embodiment, an error is logged by incrementing a counter corresponding to an action taken. In another embodiment, an error is logged by storing a record identifying parameters relating to the interrupt request such as the interrupt source, the interrupt vector, and the interrupt target.

If the interrupt target is enabled to process interrupts, the interrupt message is decoded to identify an interrupt vector and in step 116 the system 200 determines whether the interrupt vector is enabled based on the vector enable register. If the interrupt vector is enabled, the interrupt is delivered to the interrupt target in step 110. If the interrupt vector is not enabled, the interrupt vector is replaced with an error vector in step 118, the non-enablement is logged in step 120, and the error vector is delivered to the interrupt target in step 110. The log creates a record that an incorrect vector was received.

Although the steps in the flow chart 100 shown in FIG. 1 are illustrated has being in a particular order, the invention encompasses embodiments of the method where steps of the method are implemented out of the listed order. For example, in an embodiment where the local partition is a subset of the interrupt set, step 108 may be performed before step 104. As another example, the step 116 may be performed before step 112.

The method of processing interrupts described above with reference to FIG. 1 provides a level of security in inter-node communication by allowing restrictions to be enforced based on target enable and vector enable register values. In an embodiment, interrupts initiated by input/output adaptors are excluded from the interrupt set so they are not processed.

An interrupt source from the interrupt set may flood a processor, node, or local partition with excessive interrupts. In an embodiment, an interrupt source is removed from the interrupt set, to prevent a flood of interrupts for example, in response to the number of interrupts, the number of interrupts of having a particular characteristic, or the number of logged errors resulting from interrupt messages received from the interrupt source. Exemplary characteristics of interrupts include interrupts that are erroneous, unexpected, from a particular interrupt source, or from outside the local partition.

Figure 3:
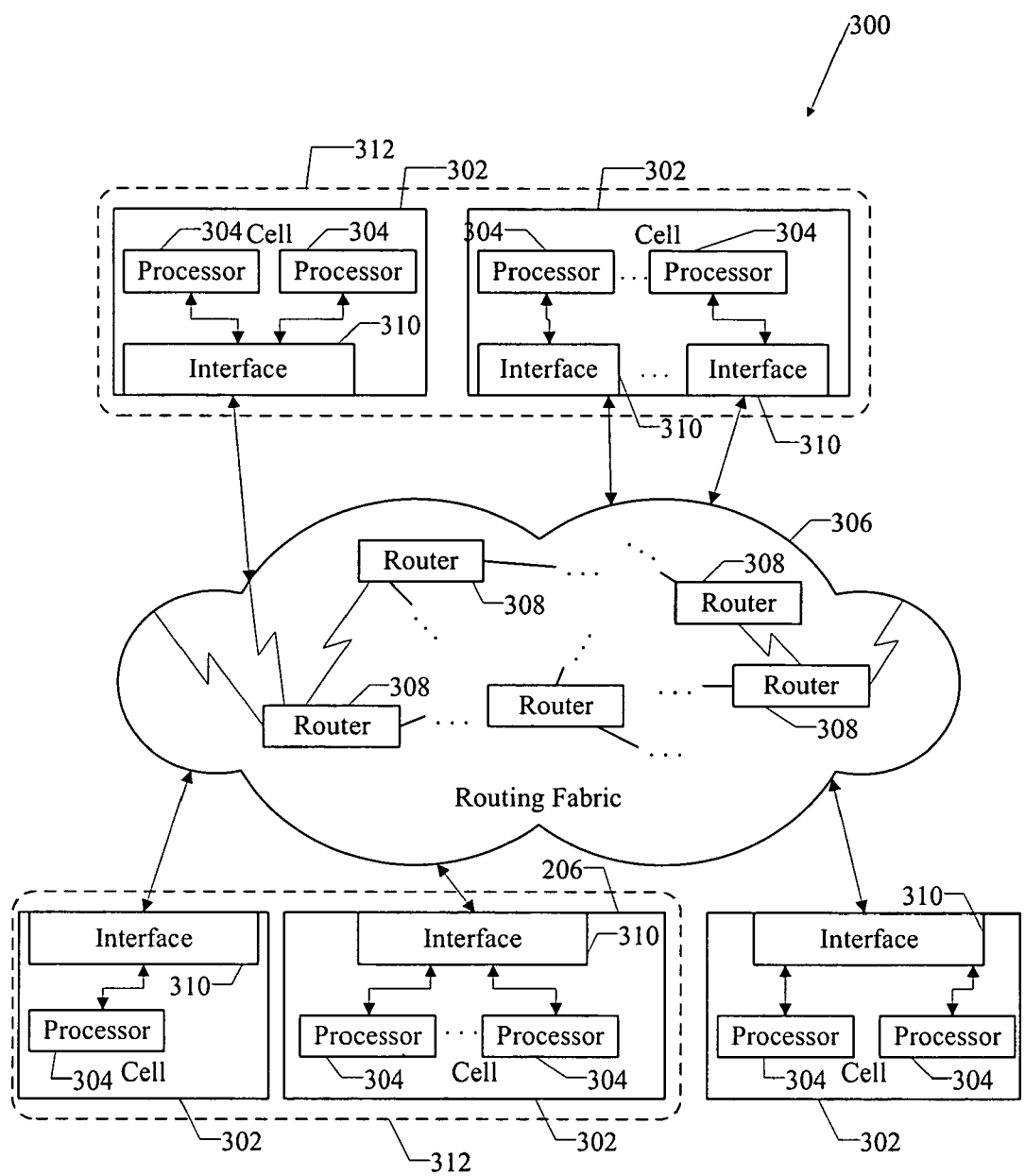
FIG. 3 is a block diagram of a multiprocessor system according to an embodiment of the invention.

A multiprocessor system according to an embodiment of the invention is shown in FIG. 3. A node (or cell) 302 comprises one or more processors 304 (a node processor) that are coupled to another node 302 via a routing fabric 306 comprising at least one router 308. One or more nodes 302 are grouped into partitions 312. The processors 304 are coupled to the routing fabric 306 via one or more interface blocks 310. In an embodiment of the invention, the system 300 is a symmetric multiprocessor system where the routers 308 are crossbars.

Figure 4:
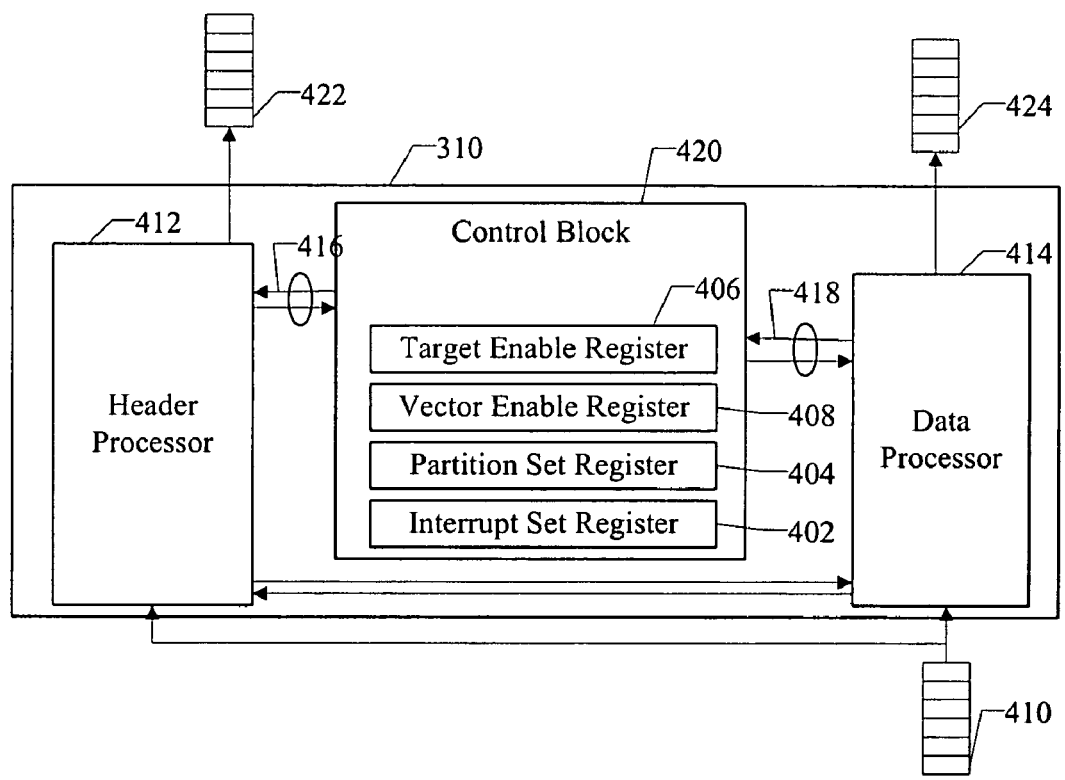
FIG. 4 is a block diagram of an interface according to an embodiment of the invention.

In an embodiment, the interface block 310 comprises an interface processor for processing an interrupt message. A block diagram of an interface module 310 according to an embodiment of the invention is shown in FIG. 4. The interface module 310 stores an interrupt set register 402, a partition set register 404, a target enable register 406, and a vector enable register 408 and processes a received interrupt message in accordance with the method of processing an interrupt message described above. In an embodiment, the interface block 310 performs the method illustrated in FIG. 1.

The interface module 310 receives an interrupt message (transaction) on an input queue 410 which segregates the received interrupt message into a header portion and a data portion. In an embodiment, the header portion comprises an identifier of the interrupt source and the data portion comprises an interrupt vector. In the embodiment shown in FIG. 4, the interrupt processor comprises a header processor 412 and a data processor 414. The header portion is transmitted to and processed by a header processor 412 and the data portion is transmitted to and processed by a data processor 414.

The header processor 412 and data processor 414 process the interrupt message in response to control signals 416, 418 received from a control block 420. The header processor 412 decodes an interrupt source identifier from the header portion and provides it to the control block 420. The data processor 414 decodes an interrupt vector from the data portion and provides it to the control block 420. The control block 420 processes a received interrupt message and determines when and if to provide the interrupt to a node processor. When the control block 420 determines to provide an interrupt to a node processor, it provides control signals 416, 418 to the header and data processors 412, 414 indicating to output the header and data to the header and data queues 422, 424, respectively. In an embodiment, the header and data processors process interrupt messages in parallel.

The foregoing describes the invention in terms of embodiments foreseen by the inventors for which an enabling description was available, although insubstantial modifications of the invention, not presently foreseen may nonetheless represent equivalents thereto.

What is claimed is:

1. A method for processing an interrupt transaction in a system having a plurality of processors arranged into at least two partitions, the method comprising:
    a. receiving an interrupt message;
    b. decoding the interrupt message to identify an interrupt source;
    c. determining whether the interrupt source is in an interrupt set;
    d. dropping the interrupt if the interrupt source is not in the interrupt set;
    e. determining whether the interrupt source is in a local partition and delivering the interrupt if the interrupt source is in the local partition; and
    f. processing the interrupt message in accordance with at least one of a target enable register and a vector enable register if the interrupt source is in the interrupt set and not in the local partition.

2. The method according to claim 1 comprising:
    decoding the interrupt message to identify an interrupt target;
    determining whether the interrupt target is enabled to accept interrupts based on the target enable register; and
    dropping the interrupt if the interrupt target is not enabled to accept interrupts.

3. The method according to claim 2 wherein the target enable register characterizes the enablement of the interrupt target to accept interrupts from outside the local partition and interrupts received from within the local partition are processed by the interrupt target independent of the target enable register.

4. The method according to claim 1 comprising:
    decoding the interrupt message to identify an interrupt vector;
    determining whether the interrupt vector is enabled based on the vector enable register; and
    replacing the interrupt vector with an error vector if the interrupt vector is not enabled.

5. The method according to claim 1 comprising determining a number of interrupts having a characteristic received from the interrupt source and removing the interrupt source from the interrupt set in response to the number of interrupts.

6. The method according to claim 1 further comprising:
    segregating the interrupt message into a header portion and a data portion;
    decoding an interrupt source identifier from the header portion in a first processor; and
    decoding an interrupt vector from the data portion in a second processor.

7. An apparatus for processing an interrupt in a system having a plurality of processors arranged into at least two partitions, the apparatus comprising:
    a. an interrupt set register identifying an interrupt source from which interrupts may be accepted;
    b. a partition set register identifying an interrupt source within the same partition as an interrupt target;
    c. a target enable register characterizing the enablement of an interrupt target to process interrupts;
    d. a vector enable register identifying interrupt vectors enabled for processing;
    e. an interface module for receiving an interrupt message, the interface module comprising an interface processor for decoding the received interrupt message to identify at least one of a corresponding interrupt source, interrupt vector, and interrupt target and selectively transmitting the received interrupt message to the interrupt target responsive to at least one of the interrupt source, interrupt vector, interrupt target, interrupt set register, partition set register, target enable register, and vector enable register.

8. The method according to claim 7 wherein the interface module decodes the interrupt message to identify an interrupt target, determines whether the interrupt target is enabled to accept interrupts based on the target enable register, and drops the interrupt if the interrupt target is not enabled to accept interrupts.

9. The method according to claim 7 wherein the interface module decodes the interrupt message to identify an interrupt vector, determines whether the interrupt vector is enabled based on the vector enable register, and replaces the interrupt vector with an error vector if the interrupt vector is not enabled.

10. The apparatus according to claim 7 comprising:
    an input queue for segregating the received interrupt message into a header portion and a data portion;
    a first processor for receiving the header portion from the input queue and decoding an interrupt source identifier from the header portion; and
    a second processor for receiving the data portion from the input queue and decoding an interrupt vector from the data portion.

11. The apparatus according to claim 10 comprising a control module with the target enable register and the vector enable register, the control module coupled to receive an interrupt source identifier and an interrupt target identifier from the first processor and an interrupt vector identifier from the second processor for controlling the first and second processors to selectively transmit the received interrupt to the interrupt target.

12. The apparatus according to claim 7 wherein the interrupt source is a processor.

13. The apparatus according to claim 7 wherein the interrupt source is a cell comprising at least one processor.

14. The apparatus according to claim 7 wherein the interrupt target is a processor.

15. The apparatus according to claim 7 wherein the interrupt target is a cell comprising at least one processor.

16. A symmetric multiprocessor system comprising a plurality of cells having at least one processor and a routing fabric for communicating a packet from one cell to another cell wherein each cell includes at least one processor and an interface to the routing fabric, the interface comprising:
    a. an interrupt set register identifying a source cell from which interrupts may be accepted;

b. a partition set register identifying a cell within the same partition as a target processor;

c. a target enable register characterizing the enablement of the target processor to process interrupts;

d. a vector enable register identifying interrupt vectors enabled for processing; and e. an interface processor for decoding a received interrupt message to identify at least one of a corresponding source cell, interrupt vector, and target processor and selectively transmitting the received interrupt message to the target processor responsive to at least one of the identified source cell, interrupt vector, target processor, interrupt set register, partition set register, target enable register, and vector enable register.

17. The system according to claim 16 wherein the interface comprises:

an input queue for segregating the received interrupt message into a header portion and a data portion;

a first processor for receiving the header portion from the input queue and decoding a source cell identifier from the header portion; and a second processor for receiving the data portion from the input queue and decoding an interrupt vector from the data portion.

18. A computer readable medium comprising computer readable code for instructing a computer to process an interrupt in a system having a plurality of processors arranged into at least two partitions, an interface module in one of the partitions for receiving an interrupt message, an interrupt set register identifying an interrupt source from which interrupts may be accepted, a partition set register identifying an interrupt source within the same partition as the interface module, a target enable register identifying an interrupt target enabled to process interrupts, and a vector enable register identifying interrupt types enabled to be processed, the code comprising instructions for:

a. receiving an interrupt message identifying an interrupt source, an interrupt target, and an interrupt vector;

b. dropping the interrupt if the interrupt source is not identified in the interrupt set as an element from which interrupts may be accepted;

c. dropping the interrupt if the interrupt source is identified in the interrupt set as an element from which interrupts may be accepted, the interrupt source is not in the same partition as the interface module, and either the interrupt target is not identified in the target enable register as an element enabled to process interrupts or the interupt is of a type not identified in the vector enable register as a type enabled to be processed; and d. transmitting the interrupt to the interrupt target if interrupt source is not dropped in one of steps (b) and (c).

19. A system for processing an interrupt in a system having a plurality of processors in at least two partitions comprising:

a. first means for receiving an interrupt message identifying an interrupt source, an interrupt target, and an interrupt vector;

b. second means for storing an interrupt set identifying an element from which interrupts may be accepted;

c. third means for storing a partition set identifying an element within the same partition as the interrupt target;

d. fourth means for storing a target enable register identifying an element enabled to process interrupts;

e. fifth means for storing a vector enable register identifying interrupt vectors enabled to be processed; and f. sixth means for selectively transmitting the received interrupt to the interrupt target responsive to at least one of the interrupt source, interrupt type, interrupt target, interrupt set, partition set, target enable register and vector enable register.

* * * * *

UNITED STATES PATENT AND TRADEMARK OFFICE
CERTIFICATE OF CORRECTION

PATENT NO. : 7,099,977 B2 Page 1 of 1
APPLICATION NO. : 10/756434
DATED : August 29, 2006
INVENTOR(S) : Huai-Ter Victor Chong et al.

It is certified that error appears in the above-identified patent and that said Letters Patent is hereby corrected as shown below:

In column 8, line 10, in Claim 18, delete "interupt" and insert -- interrupt --, therefor.

Signed and Sealed this

Twenty-fourth Day of February, 2009

JOHN DOLL
*Acting Director of the United States Patent and Trademark Office*